April 4, 1939.　　　　J. W. MARTIN　　　　2,152,967
REFRIGERATING APPARATUS
Filed April 27, 1937　　2 Sheets-Sheet 1
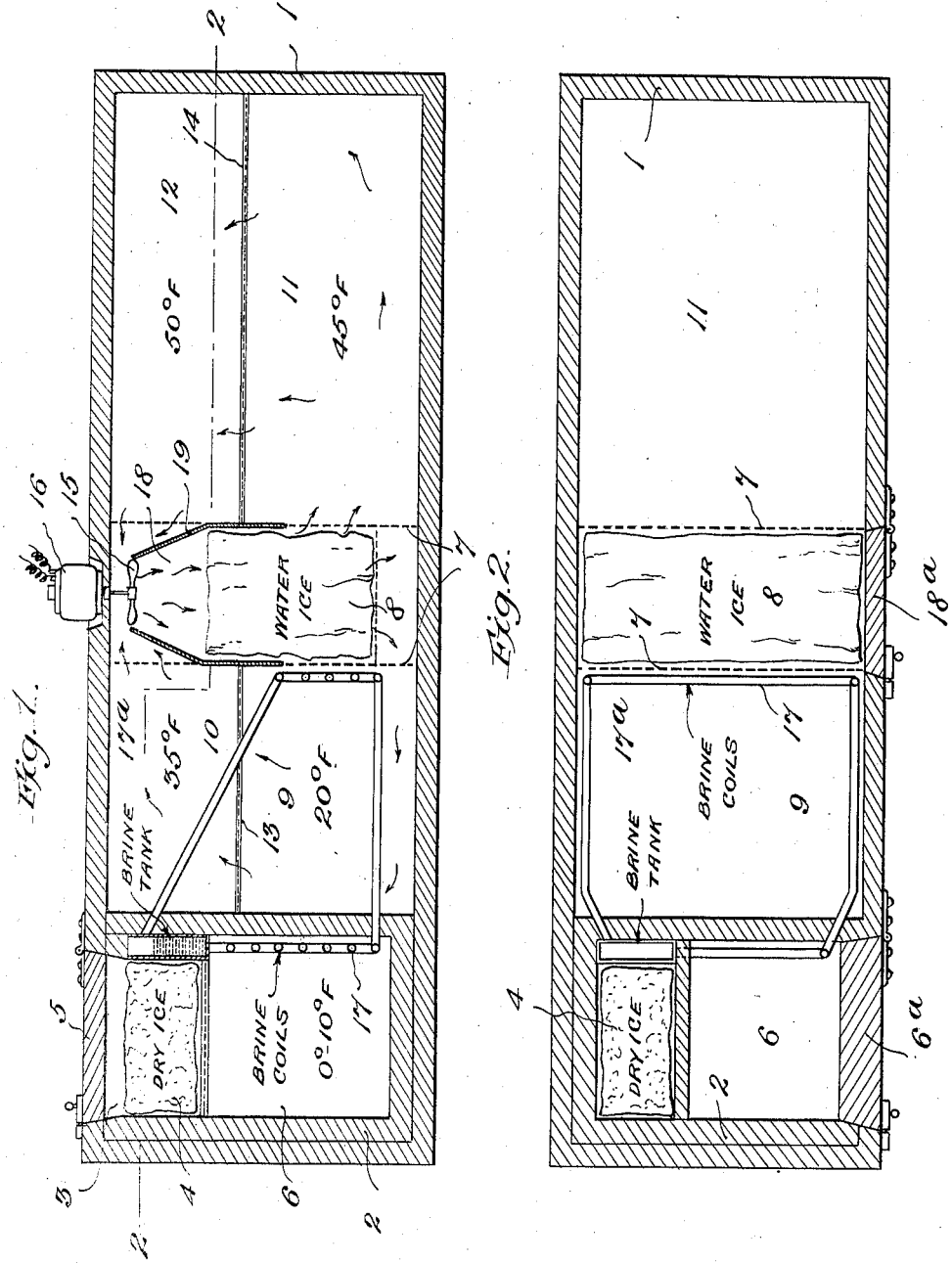
INVENTOR.
JAMES WELLFORD MARTIN
BY
ATTORNEY.

April 4, 1939.   J. W. MARTIN   2,152,967
REFRIGERATING APPARATUS
Filed April 27, 1937   2 Sheets-Sheet 2
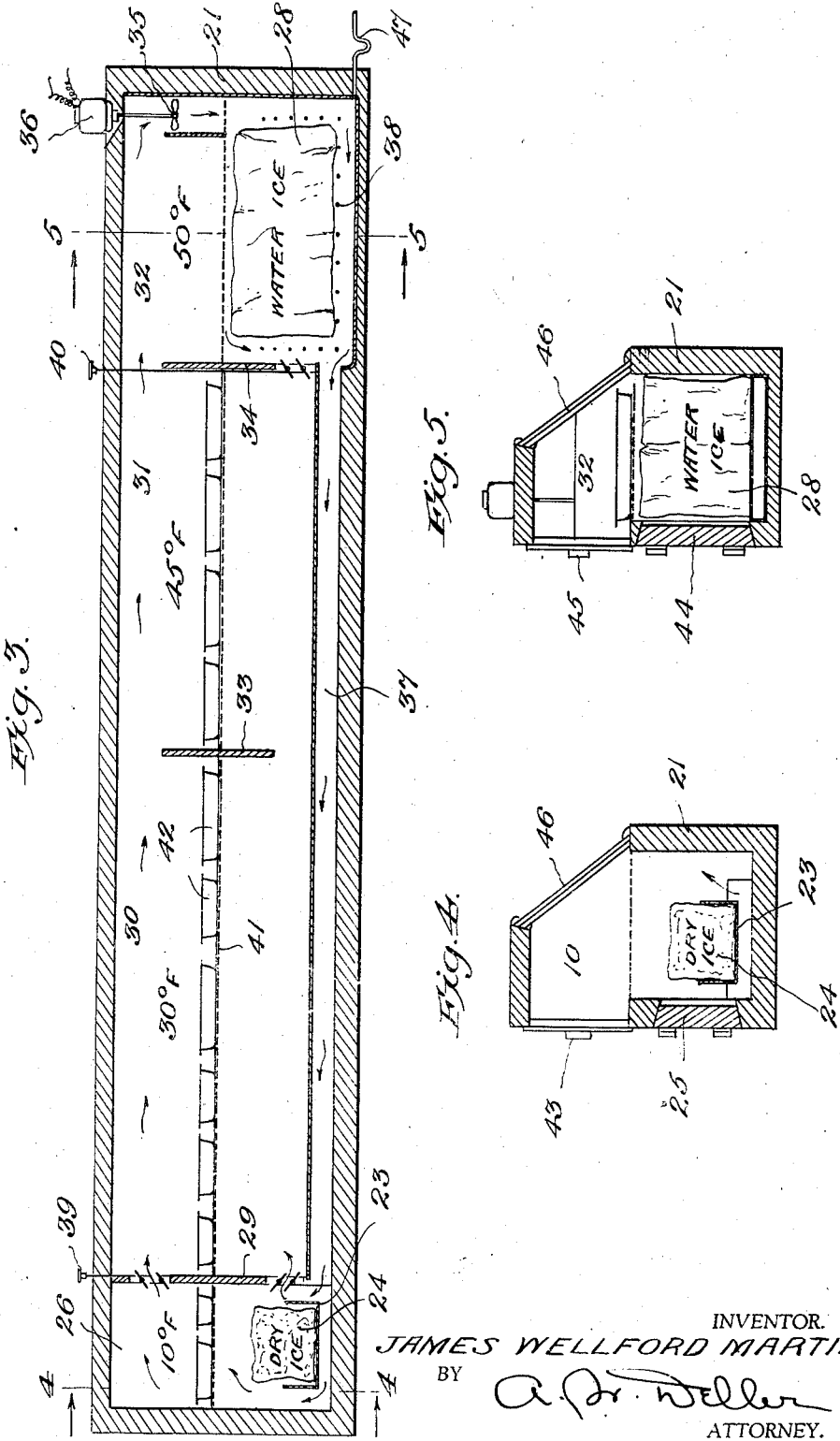
INVENTOR.
JAMES WELLFORD MARTIN
BY
ATTORNEY.

Patented Apr. 4, 1939

2,152,967

UNITED STATES PATENT OFFICE 2,152,967

REFRIGERATING APPARATUS

James Wellford Martin, Yonkers, N. Y.

Application April 27, 1937, Serial No. 139,156

20 Claims. (Cl. 62—91.5)

The present invention relates to refrigerators, and, more particularly, to a refrigerating apparatus of improved character providing and maintaining a plurality of refrigerating spaces which are differently conditioned as to their temperature, humidity and other physical properties.

As those skilled in the art know, the refrigeration and cold storage of various foodstuffs presents a technical problem of great complexity. The provision of the low temperature is only one part of this problem, although an important one, since the desirable low temperatures which are sufficient for preserving meat or fish are not low enough for hardening or storing ice cream, on the other hand carefully controlled and only moderately cold temperatures are to be provided for the storage of various fruits and vegetables most of which freeze and deteriorate at temperatures which are desirable for storing most dairy products. Thus, in a refrigerator for storing various foodstuffs a wide range of low temperatures is to be simultaneously maintained. The predetermined low storage temperature alone, however, would not assure preservation of the various articles of food but it is imperative to maintain a predetermined degree of humidity in the refrigerated chamber or container in accordance with the individual requirements of the foodstuffs. Particularly vegetables having a high water content require correctly adjusted humidity in the refrigerated space, otherwise they will dry out, wilt and generally deteriorate in quality, if not completely spoiled. Another important part of the problem of cold storage is the provision of proper atmosphere within the refrigerated chamber including circulation of the air and removal of gases developed by some foodstuffs, particularly by those of vegetable character. A further important requirement of correct refrigeration is the control of odors which includes preventing the transference of odors from one foodstuff to the others and the removal of the odors by means of correctly adjusted air circulation, absorption by means of the refrigerant and the like. In many cases it is desirable to maintain a definite concentration of carbon dioxide in the refrigerated space which retards the respiration and other life processes of fruits and vegetables and permits keeping them fresh longer than otherwise possible. A suitable concentration of carbon dioxide is highly beneficial also in the storage of bacon and other foodstuffs of animal origin in that it checks decay organisms attacking these products.

Heretofore, the principal refrigerant used in the art of refrigeration was water ice. Of course, water ice-operated refrigerators had great limitations and provided only crude attempts to a complete solution of the problem. Although the temperature of melting ice is 32° F., it was difficult to provide storing temperatures lower than 40° or 45° F. by means of ice and it was, of course, altogether impossible to obtain temperatures lower than 32° F., unless salting and the like expensive and cumbersome measures have been resorted to. Quite recently great progress has been made in the application of dry ice, or solid carbon dioxide as a refrigerant which permitted obtaining very low temperatures in a simple and practical manner and various refrigerators have been put on the market operated with dry ice. Dry ice had the advantage of considerably greater refrigerating power and in view of the fact that dry ice sublimates completely into large amounts of carbon dioxide gas various efficient principles have been developed to utilize these large amounts of carbon dioxide gas as a heat insulating or heat transfer medium in widely varying forms. Even though the application of dry ice provided great advantages over water ice in some respects, particularly in the wider range of obtainable temperatures, simplicity of operation, on the other hand water ice was by far superior in some other respects, particularly in that it readily permitted to automatically maintain correct and desirable humidity within the refrigerated space, and that the odor-laden air of the refrigerated spaces when passed in contact with the water ice has been purified and objectionable odors could be removed with the ice water. From the above considerations it clearly appears that the complex problem of simultaneously preserving a great variety of foodstuffs under ideal storage conditions could not be solved by either the water ice or the dry ice operated refrigerators. Although numerous suggestions and proposals have been made from time to time to solve the outstanding problem, none, as far as I am aware, of these various suggestions and proposals was completely satisfactory and successful when carried into practice on a practical and commercial scale. I have discovered that the problem may be solved in a remarkably simple manner.

It is an object of the present invention to eliminate all of the above disadvantages of conventional refrigerators.

It is another object of the present invention to provide an improved refrigerator embodying a plurality of definitely confined refrigerated spaces each of which is cooled to a predetermined temperature.

It is a further object of the present invention to provide a refrigerator of novel and improved character permitting to obtain a wide range of refrigerating temperatures from about 50° F. down to about 0° F. by the combination of at least two different refrigerants.

Furthermore, the invention provides a refrigerator employing a primary and a secondary refrigerant, such as for example water ice and dry ice for maintaining desirable wide temperature ranges and humidity and odor control conditions.

The invention also contemplates a refrigerator capable of maintaining ideal storage conditions for the preservation of various foodstuffs, which is simple in construction and which is inexpensive to manufacture and to operate on a practical and commercial scale.

Other and further objects and advantages of the invention will become apparent from the following description taken in conjunction with the accompanying drawings, in which:

Fig. 1 illustrates a vertical sectional view of a refrigerator embodying the principles of the present invention;

Fig. 2 depicts a horizontal section taken on line 2—2 of Fig. 1;

Fig. 3 shows a vertical sectional view of a modified embodiment of the present invention;

Fig. 4 is a section taken on line 4—4 of Fig. 3; and

Fig. 5 represents a sectional view taken on line 5—5 of Fig. 3.

Broadly stated, according to the principles of the present invention, I provide a plurality of definitely confined refrigerated spaces which are in restricted and controlled communication with each other. I provide a plurality of different refrigerants such as for example dry ice and water ice in selective and combined heat exchange with the said compartments and control said heat exchange in such manner that the individual compartments or refrigerated spaces are maintained at predetermined low temperatures. I prefer to employ water ice alone as refrigerant for maintaining temperatures between about 35° and about 45° F., a combination or the combined heat exchange with water ice and dry ice for temperatures between about 20° F. to about 35° F. and dry ice alone for obtaining temperatures below 20° F. In addition to the heat exchange between the water ice and the dry ice and the refrigerated spaces, I found it of great advantage to establish controlled heat exchange between the water ice and surrounding of the dry ice. The object and the advantage of this heat exchange is to principally utilize the cheaper water ice for absorbing the heat leaking into the refrigerator through the outer insulated walls and through the service doors. The moderate and controlled heat exchange between the dry ice and the water ice may be provided solely by means of air circulation between the individual refrigerated spaces or by means of brine coils or similar heat exchange and transfer devices. In most cases I prefer to assist the natural circulation of atmosphere within the refrigerator by means of a fan of small dimensions and control the circulation in such manner that substantially all of the gases within the refrigerated spaces are periodically contacted with the water ice in order to humidify the atmosphere and to pass the odor-laden air in contact with the wet surface of the water ice and thereby to absorb, remove or control the transfer of odors from one foodstuff to the others. Of course, the character of the humidity and odor control may be and is preferably maintained different for the various compartments in accordance with the special requirements of the different foodstuffs stored therein. Conventional means as baffles, damper controls and the like devices may be employed to obtain the desired conditions for the said circulation of the atmosphere within the refrigerator. An added object of this circulation is to employ the water ice as a primary refrigerant so far as this is practically possible so that substantially all of the insulation losses should be absorbed by the water ice rather than by the much more expensive dry ice, while the secondary refrigerant or dry ice is supplying only the cooling of the compartments having the lowest temperatures. I found that this type of operation has considerable advantages in that a relatively small quantity of dry ice will last for a long interval and generally the dry ice has to be replaced at much less frequent intervals than the water ice. Although it is quite possible to arrange water ice and the dry ice in close proximity of each other, I generally prefer to arrange them at some distance. For example, in refrigerators of an elongated form such as used in grocery stores for the display and storage of perishables, I found it very advantageous to provide the water ice in the center portion of the refrigerator and the dry ice at one of the extremities of the refrigerator, or to provide water ice and dry ice at the two extremities of the refrigerator as this will be more fully described hereinafter.

Referring now more particularly to Figs. 1 and 2, a preferred embodiment of the invention is illustrated essentially comprising an elongated box or casing 1 having walls of good heat insulating quality and being subdivided by means of foraminous partition walls 7, 13 and 14 into a plurality of communicating refrigerating spaces or compartments 6, 9, 10, 11 and 12. At the left end of casing 1, a compartment 3 is provided for the dry ice 4 which may be inserted through a door or cover 5. Directly underneath the dry ice compartment and in intimate heat exchange therewith is a compartment 6 where the coldest temperatures are maintained within the refrigerator. Preferably, compartments 3 and 6 are provided with an additional heat insulation 2 in order to reduce insulation losses to a minimum. In the central portion of the refrigerator and confined by foraminous partition walls 7 is a compartment 18 for the water ice 8 which is preferably supported in such manner that it may be exposed from all sides to the atmosphere within the refrigerator. Brine coils 17 provide a restricted heat exchange between the surrounding of the dry ice and the water ice and have the double purpose of maintaining compartment 9 at a low temperature by the combined refrigerating action of both the dry and of the water ice and at the same time to obtain absorption of heat losses in the proximity of the dry ice and caused by leakage of heat through the walls and the service doors substantially by the cheaper water ice. Of course, instead of the brine coils other conventional heat exchange devices, such as convection fins may be employed with equal or similar results, as those skilled in the art will readily understand. Above the ice compartment 18 and water ice 8, I provide a small fan 15 actuated by an electromotor 16 located outside of casing 1. Fan 15 co-operates with a shield 19 of suitable form to direct the air current along the surface of water ice 8. Additional doors 6a and 18a are provided in the side walls of casing 1, in order to make the interior of the corresponding compartments readily accessible.

From the preceding description the operation of my improved refrigerator will be readily understood by those skilled in the art. First of all, a suitable quantity of dry and of water ice is introduced into their respective compartments and fan 15 is rotated by means of electromotor 16. Rotation of the fan will provide a double circulation of the air within the refrigerator, one of these circulations being through compartments 9, 10 and the water ice compartment, the other through compartments 11, 12 and the water ice compartment 18. It will be readily seen that a wide range of temperatures will be maintained within the various compartments so long as there is dry ice and water ice available and so long as the fan is maintained in rotation. The coldest of all compartments is compartment 6 which is in the immediate proximity of dry ice compartment 3 and in intimate heat exchange with dry ice 4. In this compartment temperatures of 0° to about 10° F. are easily maintained. The next compartment, compartment 9 is cooled by the combined effect of the dry ice and water ice through brine coils 17 and also by means of cold air directly obtained from the water ice chamber and may be easily adjusted to temperatures of about 20° F. Compartment 10 which is located directly above compartment 9 is cooled substantially by the cold air derived from the water ice and further cooled through its passage through compartment 9 and will have a slightly higher temperature, such as, for example, 35° F. Compartments 11 and 12 located at the right side of the refrigerator are cooled by the effect of water ice only and are maintained at temperatures of about 45° F. and 50° F., respectively. The circulation of air within and through the various refrigerating compartments has the additional effect that the air is passed periodically and at short intervals in contact with the wet surface of the water ice whereby the air is humidified to the desirable extent and objectionable odors are absorbed. Of course, the temperatures maintained in the various compartments may be adjusted to individual refrigerating requirements by means of proper design.

A modified embodiment of the invention is illustrated in Figs. 3 to 5. An elongated casing 21 made of heat insulating material is subdivided into a plurality of compartments 26, 30, 31 and 32, by means of partition walls 29, 33 and 34. At the left extremity of the casing is located dry ice 24 on a suitable support 23, while a substantially larger quantity of water ice 28 is provided on a supporting member or railing 38 at the other end of the casing. At the lower portion of the casing a channel 37 is provided which directly connects the water ice chamber with the dry ice chamber. Circulation of the air and other gases within the various refrigerated spaces is obtained by means of a fan 35, actuated by means of an electromotor 36. Fan 35 maintains a constant circulation in the direction indicated by the arrows, the circulation passing through channel 37, through the dry ice chamber and through the openings provided in the partition walls 29 and 34 and the upper portion of the casing back to the water ice chamber. In this manner a permanent and desired temperature gradient is maintained in the various compartments within the refrigerator. These temperatures and the circulation may be adjusted within wide limits by adjusting the dampers 39 and 40 which control the openings in the partition walls 29 and 34. A preferred temperature adjustment which has been advantageous for most practical purposes is shown in Fig. 3, in which temperatures of 10°, 30°, 45°, and 50° F., are maintained in the various compartments of the refrigerator. Of course, in addition to the cooling, the circulation at the same time provides proper control of humidity and of odors same as this is the case in the embodiment illustrated in Figs. 1 and 2 and in addition to this also insures the presence of a suitable carbon dioxide concentration in the refrigerated spaces. Casing 21 is provided with doors 43 and 45 for inserting and removing perishables into the various cooling compartments and with doors 25 and 44 for inserting dry ice and water ice into their respective chambers. As customary, the various perishables are stored in trays 42 supported on railings 41 and are displayed and visible through windows 46 in the usual manner.

It is to be noted that my invention provides a number of important advantages. First of all, a novel and improved refrigerator is provided which combines the advantages of both water ice and dry ice operated refrigerators and which substantially eliminates all of the disadvantages and inconveniences experienced with conventional refrigerators.

It is also to be observed that in my improved refrigerator a plurality of compartments representing a very wide range of refrigerating temperatures is provided, all of which are properly conditioned as for humidity, odor control and for carbon dioxide concentration and which are selectively cooled by the combined effect of water ice and dry ice in such a manner that relatively small amounts of the more expensive dry ice are consumed.

Moreover, my improved refrigerator is very simple in construction and is inexpensive to manufacture and to operate so that it is available also to smaller stores or homes at a fraction of the cost of mechanical refrigeration.

Although I have described my invention in connection with a few preferred embodiments thereof, variations and modifications may be resorted to by those skilled in the art without departing from the principles of the present invention. Thus, the combined effect of water ice and of dry ice may be used with similar results for the purpose of air conditioning, with or without the simultaneous application of chemical drying agents to adjust the humidity within desired limits. I consider all of these variations and modifications as within the true spirit and scope of the present invention as disclosed in the present description and defined by the appended claims.

I claim:

1. A refrigerating apparatus which comprises a thermally insulated casing, a plurality of merchandise storage compartments in restricted and controlled communication with each other, a pair of refrigerant holding devices each adapted to hold a different refrigerant, and means for selectively placing said compartments in heat exchange relation with refrigerants in said devices to maintain said compartments at predetermined low temperatures.

2. A refrigerating apparatus which comprises an insulated casing, a plurality of merchandise storage compartments in said casing in restricted and controlled communication with each other for storing articles to be refrigerated, a water ice holding device in said casing, a dry ice holding device in said casing, and means for selectively placing said compartments in heat exchange relation with ice in said ice holding devices to cool said compartments to predetermined low temperatures.

3. A refrigerating apparatus which comprises a heat-insulated casing, a plurality of merchandise storage compartments in said casing, a water ice holding device in said casing, a dry ice holding device in said casing, means for selectively placing ice in said ice holding devices in heat exchange relation with said storage compartments to cool same to predetermined low temperatures, and means for placing the water ice and dry ice in said devices in restricted heat exchange relation with each other.

4. A refrigerating apparatus which comprises a heat-insulated casing, a plurality of merchandise storage compartments in said casing, a water ice holding device and a dry ice holding device in said casing located at a substantial distance from each other, means for placing at least one of said compartments in heat exchange relation substantially only with the water ice, means for placing at least one of said compartments in heat exchange relation substantially only with the dry ice, and means for placing at least one of said compartments in heat exchange relation with both the water and dry ice.

5. A refrigerating apparatus which comprises a heat-insulated casing, a plurality of merchandise storage compartments in said casing, a dry ice holding device and a water ice holding device in said casing located at a substantial distance from each other, means for placing at least one of said compartments in heat exchange relation substantially only with the dry ice to provide the lowest cooling temperatures, means for placing at least one of said compartments in heat exchange relation substantially only with the water ice to provide highest cooling temperatures, and means for placing at least one of said compartments in heat exchange relation with both said dry and water ice to provide intermediate temperatures.

6. A refrigerating apparatus which comprises a heat-insulated casing, a plurality of merchandise storage compartments in said casing, a dry ice holding device and a water ice holding device in said casing located at a substantial distance from each other, means for placing at least one of said compartments in substantially exclusive heat exchange relation with the dry ice, means for placing at least one of said compartments in substantially exclusive heat exchange relation with the water ice, means for placing at least one of said compartments in heat exchange relation with both the dry and water ice, and means for establishing controlled heat exchange between the dry and water ice whereby heat leaking into the surrounding of said dry ice holding device is principally absorbed by the water ice.

7. A refrigeration apparatus which comprises a heat-insulated casing, foraminous partition walls in said casing dividing the same into a plurality of merchandise storage compartments, a water ice and a dry ice holding device located in said casing at a substantial distance from each other, means for placing at least one of said compartments in heat exchange relation with the water ice, means for placing at least one of said compartments in heat exchange relation with the dry ice, means for placing at least one of said compartments in heat exchange relation with both the dry and water ice, and means for causing circulation of the gases within the casing to remove heat from said various storage compartments and to establish a temperature gradient along the path of said circulation.

8. A refrigerating apparatus which comprises a heat-insulated casing, foraminous partition walls in said casing dividing the same into a plurality of merchandise storage compartments, a water ice and a dry ice holding device located in said casing at a substantial distance from each other, means for placing at least one of said compartments in heat exchange relation with the water ice, means for placing at least one of said compartments in heat exchange relation with the dry ice, means for placing at least one of said compartments in heat exchange relation with both the dry and water ice, and an air impeller to cause circulation of the gases through said compartments whereby a temperature gradient is established along the path of said circulation and said storage compartments are selectively deodorized and humidified by passage of said gases in contact with said water ice.

9. A refrigerating apparatus which comprises a heat-insulated casing, a dry ice holding device at one of the extremities of said casing, a water ice holding device in the center portion of said casing and separating said casing into two substantially independent units, foraminous partition walls in said casing forming a plurality of communicating merchandise storage compartments in each of said units, heat transfer means including a brine container and brine coils between said ice holding devices, air impelling means for causing independent circulation of air within said two units to cause convective heat exchange, and means for adjusting said circulation.

10. A refrigerating apparatus which comprises a heat-insulated casing of elongated form, a dry ice holding device at one of the extremities of said casing, a water ice holding device at the other extremity of said casing, a plurality of partition walls providing a plurality of communicating merchandise storage compartments between the two extremities of said casing, openings in some of said partition walls, means for circulating gases through said casing in contact with the dry and the water ice to maintain low temperatures from about 10° F. to about 50° F. in the various storage compartments, and damper means cooperating with said openings to adjust said circulation and said temperatures.

11. A refrigerating apparatus which comprises a heat-insulated casing of elongated form, a dry ice compartment at one of the extremities of said casing, a water ice compartment at the other extremity of said casing, a channel in the bottom portion of said casing connecting said ice compartments, horizontal and vertical partition walls providing a plurality of communicating merchandise storage compartments between the two extremities of said casing, openings in said vertical partition walls, means for causing circulation of gases through said storage and ice compartments and through said bottom channel to maintain different low temperatures in the various storage compartments, and adjustable damper means co-operating with said openings to adjust said circulation and said temperatures whereby humidity and odor control is provided by said water ice and a preferred carbon dioxide concentration is provided by said dry ice.

12. The method of maintaining a confined space at a refrigerating temperature which comprises supporting dry ice and water ice in said space at a substantial distance from each other, establishing limited heat exchange relation between said dry ice and water ice, and controlling said heat exchange relation in such a manner as to maintain the surface of said water ice in a wet condition capable of absorbing odors from air passed in contact therewith.

13. The method of maintaining a confined space at a refrigerating temperature which comprises supporting dry ice and water ice in said space at a substantial distance from each other, establishing limited heat exchange relation between said dry ice and water ice, controlling said heat exchange relation in such a manner as to maintain the surface of said water ice in a wet condition, and passing a current of air in contact with said dry ice and water ice whereby a preferred carbon dioxide concentration and humidity is maintained within said space and odors are absorbed from said air.

14. A refrigerating apparatus which comprises a heat-insulated casing, a plurality of merchandise storage compartments in said casing, a dry ice holding device and a water ice holding device in said casing, located at a substantial distance from each other, means for placing at least one of said compartments in heat exchange relation substantially only with the dry ice to provide cooling temperatures below about 10° F., means for placing at least one of said compartments in heat exchange relation substantially only with the water ice to provide cooling temperature from about 40° to about 50° F., and means for placing at least one of said compartments in heat exchange relation with both dry and water ice to provide intermediate cooling temperatures.

15. A refrigerating apparatus which comprises a casing, a plurality of merchandise storage compartments in said casing, a dry ice holding device and a water ice holding device in said casing located at a substantial distance from each other, means for placing at least one of said compartments in heat exchange relation with the dry ice to provide lower cooling temperatures than obtainable with water ice, means for placing at least one of said compartments in heat exchange relation with the water ice to provide higher cooling temperatures, and means for placing said water ice in restricted heat exchange relation with the surrounding of said dry ice whereby the bulk of heat entering the refrigerator is absorbed by the water ice.

16. A refrigerating apparatus which comprises a heat-insulated casing, a plurality of merchandise storage compartments in said casing, a dry ice and a water ice holding device in said casing located at a distance from each other, heat transfer means including brine coils in heat exchange relation with both the dry and water ice for maintaining preferred proportion between melting of the dry ice and of the water ice, means for placing at least one of said storage compartments in heat exchange relation with the dry ice to provide the lowest cooling temperature, means for placing at least one of said compartments in heat exchange relation with the water ice to provide the highest cooling temperatures, and means for placing at least one of said compartments, in heat exchange relation with both the water ice and with said brine coils to provide intermediate cooling temperatures.

17. A refrigerating apparatus which comprises a heat-insulated casing, a dry ice holding device at one of the extremities of said casing, a water ice holding device in the center portion of said casing and separating said casing into two substantially independent units, heat transfer means including brine coils in heat exchange relation with both the dry and the water ice, foraminous partition walls in said casing forming a plurality of communicating merchandise storage compartments in each of said units, and air impelling means for causing independent circulation of air within said two units whereby convective heat exchange will be established between the water ice and the storage compartments constituting one of said units and between the water ice and the brine coils and the storage compartments constituting the other of said units.

18. A refrigerating apparatus which comprises a heat-insulated casing of elongated form, a dry ice holding device at one of the extremities of said casing, a water ice holding device at the other extremity of said casing, a plurality of merchandise storage compartments between the two extremities of said casing in restricted and controlled communication with each other, and means for causing circulation of gases through said storage and ice compartments for selectively placing said compartments in heat exchange relation with ice in said ice holding devices to cool said compartments to predetermined low temperatures and to establish a temperature gradient along the path of said circulation from about 10° F. to about 50° F.

19. A refrigerating apparatus which comprises a heat-insulated casing, a dry ice holding device and a water ice holding device located at a substantial distance from each other, a plurality of merchandise storage compartments in said casing in restricted and controlled communication with each other, at least one of said compartments being cooled to a temperature below 32° F., and means for causing circulation of gases through said storage and ice compartments for selectively placing said compartments in heat exchange relation with ice in said ice holding devices to cool said compartments to predetermined low temperatures, said gases including air freshly washed by means of the wetted surface of the melting water ice for removing odors from said storage compartments and carbon dioxide of which a portion is absorbed by said melting water ice to prevent excessive concentrations thereof.

20. A refrigerating apparatus which comprises a heat-insulated casing, a dry ice holding device and a water ice holding device in said casing located at a substantial distance from each other, a plurality of merchandise storage compartments in said casing in restricted and controlled communication with each other, means for causing circulation of gases including humidified air through said storage and ice compartments for selectively placing said compartments in heat exchange relation with ice in said ice holding devices to condition and to cool said compartments to predetermined low temperatures, and means for passing at least part of said air over the surface of the water ice for maintaining the humidity at a dew point of 32° F. and for removing odors from said air.

JAMES WELLFORD MARTIN.